US012456147B1

(12) United States Patent
Nath

(10) Patent No.: US 12,456,147 B1
(45) Date of Patent: Oct. 28, 2025

(54) INTEGRATED PROPERTY AND LENDING SEARCH AND/OR TRANSACTION

(71) Applicant: Wells Fargo Bank, N.A., San Francisco, CA (US)

(72) Inventor: Narendra Nath, Hillsborough, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 8 days.

(21) Appl. No.: 18/174,100

(22) Filed: Feb. 24, 2023

Related U.S. Application Data

(60) Provisional application No. 63/269,501, filed on Mar. 17, 2022.

(51) Int. Cl.
*G06Q 40/03* (2023.01)
*G06Q 50/16* (2012.01)

(52) U.S. Cl.
CPC ............ *G06Q 40/03* (2023.01); *G06Q 50/16* (2013.01)

(58) Field of Classification Search
None
See application file for complete search history.

(56) References Cited

U.S. PATENT DOCUMENTS

| | | | |
|---|---|---|---|
| 8,433,650 B1 * | 4/2013 | Thomas | G06Q 40/02 705/38 |
| 10,269,054 B1 * | 4/2019 | Thomas | G06Q 40/02 |
| 2007/0255581 A1 * | 11/2007 | Otto | G06Q 30/06 705/316 |
| 2008/0015890 A1 * | 1/2008 | Malyala | G06Q 50/16 705/313 |
| 2012/0246024 A1 * | 9/2012 | Thomas | G06Q 30/06 705/27.1 |
| 2012/0330759 A1 * | 12/2012 | Aggarwal | G06Q 50/06 715/733 |
| 2013/0325606 A1 * | 12/2013 | Balduf | G06Q 30/02 705/14.66 |
| 2016/0093007 A1 * | 3/2016 | Richardson | G06Q 30/0611 705/26.4 |
| 2017/0323378 A1 * | 11/2017 | Dintenfass | G06Q 30/0201 |
| 2021/0103998 A1 * | 4/2021 | Rose | G06Q 30/0645 |
| 2022/0092621 A1 * | 3/2022 | Abdallah | G06Q 30/0625 |

OTHER PUBLICATIONS

U.S. Appl. No. 16/940,728, filed Jul. 28, 2020.
U.S. Appl. No. 17/204,442, filed Mar. 17, 2021.
U.S. Appl. No. 17/204,583, filed Mar. 17, 2021.

\* cited by examiner

*Primary Examiner* — William J Jacob
(74) *Attorney, Agent, or Firm* — Merchant & Gould P.C.

(57) ABSTRACT

An example system for generating an integrated property and lending search experience can include: at least one processor; and memory encoding instructions which, when executed by the at least one processor, cause the system to: generate a property engine programmed to search for homes meeting certain home parameters; generate a lending engine programmed to search for loans meeting certain loan parameters, the loan parameters including a down payment amount and/or a monthly payment amount; and display information about one or more homes meeting both the home parameters and the loan parameters.

14 Claims, 11 Drawing Sheets

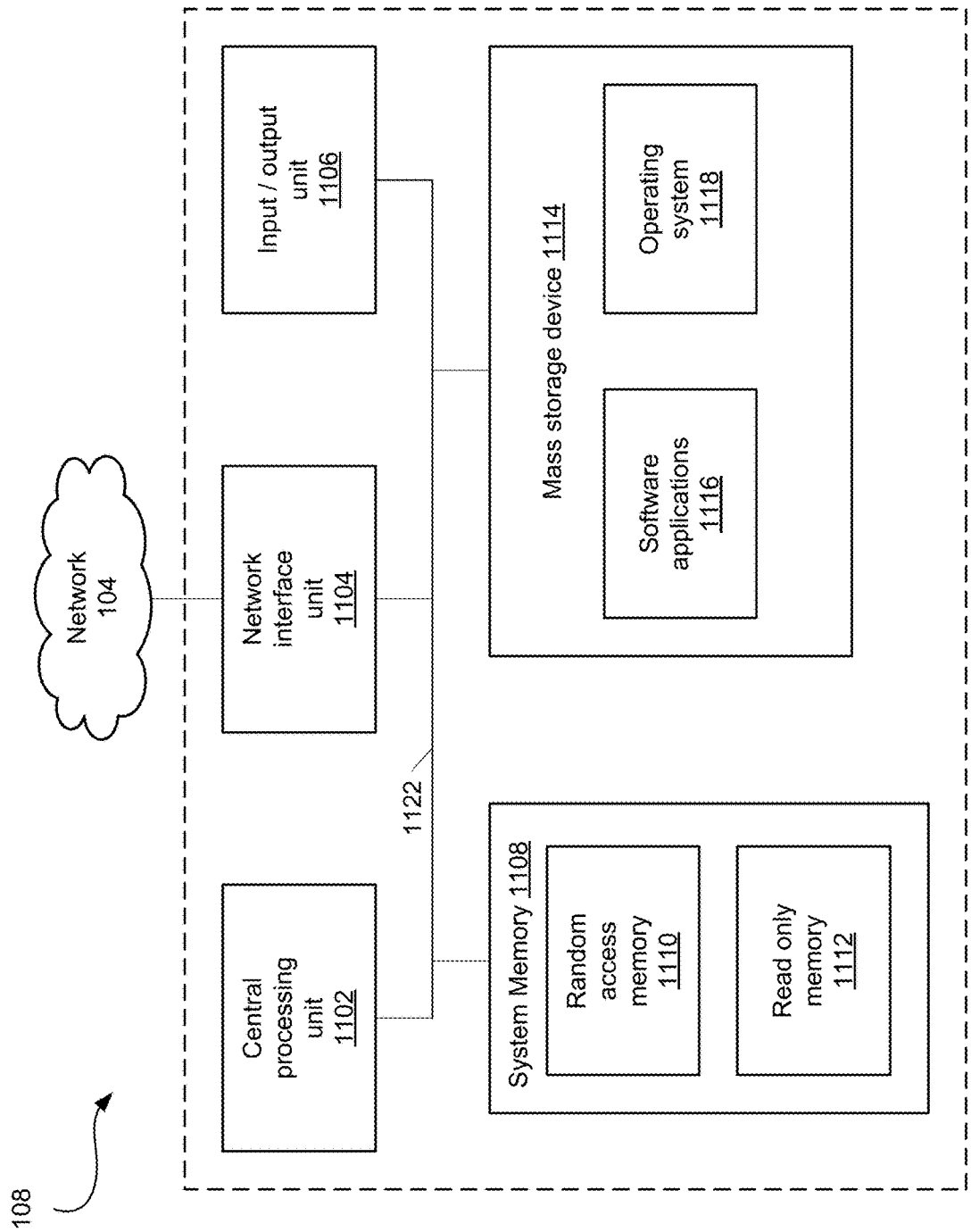

INTEGRATED PROPERTY AND LENDING SEARCH AND/OR TRANSACTION

BACKGROUND

There are many online tools that can be used when searching for a home. Some tools allow a buyer to search for homes based upon a desired purchase price, location, square footage, number of bedrooms, number of bathrooms, or any combination of these or similar search criteria. There are also many online tools that allow the buyer to calculate monthly mortgage payments based on a loan amount and down payment amount or vice versa, and/or request loan pre-qualification. Such individual tools may not provide the buyer with a complete view of the desired information when searching for a home and a loan.

Furthermore, there are many online tools that allow the buyer to find a desired home or loan and then have to fill out a form for a real estate agent or a mortgage consultant agent, respectively, to contact them. Such online tools do not provide the buyer with a streamlined experience, empowering the buyer to make an offer on a desired home in a preferred and efficient manner.

SUMMARY

Embodiments described herein are directed to an integrated property and lending search and/or transaction experience.

According to non-limiting aspects of the present disclosure, an example system for generating an integrated property and lending search experience can include: at least one processor; and memory encoding instructions which, when executed by the at least one processor, cause the system to: generate a property engine programmed to search for homes meeting certain home parameters; generate a lending engine programmed to search for loans meeting certain loan parameters, the loan parameters including a down payment amount or a monthly payment amount; and display information about one or more homes meeting the home parameters and the loan parameters.

The details of one or more techniques are set forth in the accompanying drawings and the description below. Other features, objects, and advantages of these techniques will be apparent from the description, drawings, and claims.

DESCRIPTION OF THE DRAWINGS

FIG. 11 shows example components of the server of FIG. 2.

DETAILED DESCRIPTION

Embodiments described herein are directed to an integrated property and lending search and/or transaction experience.

Generally, the embodiments described herein can combine a property search, such as a search for a home, with a lending search, such as a search for a mortgage to purchase a home. In addition, in some embodiments, the purchase process is stream-lined to minimize the effort needed by the buyer and a seller to consummate a purchase. The combination can create an integrated experience for a buyer, so that searching for a home and a loan can be more intuitive, and the purchase process can be streamlined.

More specifically, in the examples provided herein, the buyer can search based upon parameters that may be the most important to the buyer, and those parameters can be used to provide potential homes and mortgages that meet the buyer's needs. As provided further below, examples of such parameters include, without limitation, a down payment amount and/or a monthly payment amount for the home.

Further, once the home is located, the examples described herein can provide a streamlined process for the buyer and the seller to consummate the purchase of the home.

While described herein in the context of a "home" for the convenience of illustration, in various other examples, the described embodiments may relate to purchases of other types of real property, such as commercial property or multi-family property. Likewise, while described herein in the context of a "home loan", in various other examples, the described embodiments may relate to other types of real property loan products.

The examples described herein can result in various technical advantages. For instance, the searching for homes based upon specific parameters can result in the practical application of a more efficient process for locating the desired homes, as well as a more accurate process for locating desired homes for a buyer. Further, integrating the search for a home with the search for a loan can result in a streamlined process requiring less resources to conduct the searches. This can require less coordination and management on the side of the buyer to connect the loan amount, which is a means to the end, to the home to be purchased, which is the end product the buyer is interested in purchasing.

Moreover, embodiments described herein provide a new, streamlined, and efficient platform for purchasing and disposing of real property. Whereas a home may traditionally spend thirty to sixty days on the market before the new owner takes possession, embodiments described herein facilitate instant offers to address many of the time-consuming pain points in the traditional home buying experience. Finally, the various user interfaces provided herein can be arranged in an optimized manner to allow for more efficient input of data, processing of data, and/or output of data, particularly on smaller screens associated with mobile computing devices.

Figure 1:
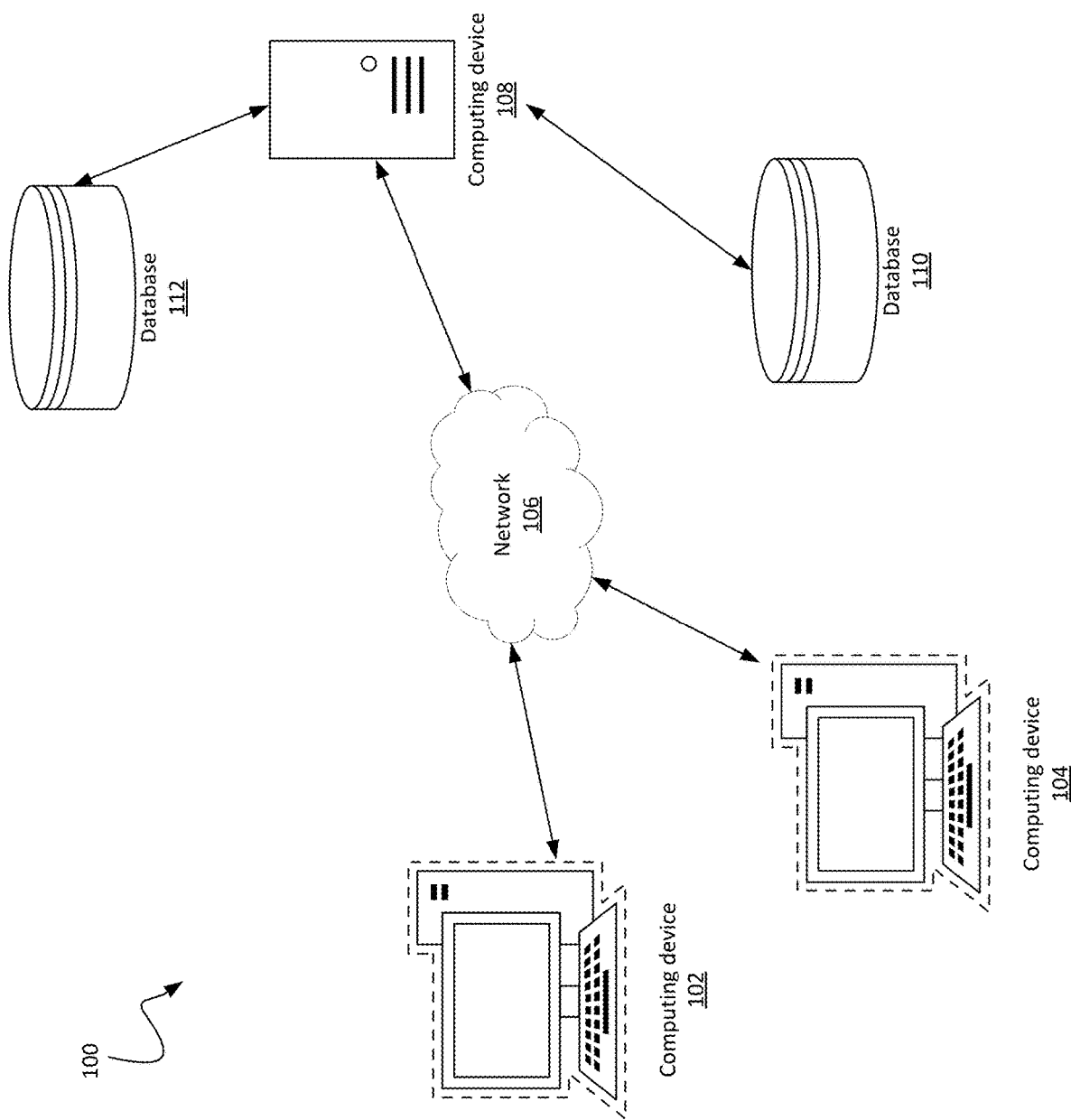
FIG. 1 shows an example system providing an integrated property and lending search experience.

FIG. 1 schematically shows components of an example system 100 that is programmed to provide an integrated home and lending search experience. In this example, the system 100 generally includes a buyer computing device 102, a seller computing device 104, a network 106, a server computing device 108, and databases 110, 112.

The example computing devices of the system 100 can include various types of devices, such as laptops, desktops, tablets, servers, server farms, etc. For instance, one or both of the buyer computing device 102 and the seller computing device 104 can be mobile computing devices with typically smaller screens and limited input devices. The example user interfaces provided herein can be optimized for display on such smaller screens and receive input using such mobile devices. Each of the computing devices of the system 100 can include one or more storage media encoding instructions which, when executed by one or more processors, implement the functionality described herein.

Although multiple computing devices are shown in the example system 100, the functionality described herein can be implemented on one or many computing devices. For instance, in other implementations, there are hundreds or thousands of buyer and/or seller computing devices. Further, the server can be implemented as multiple devices that spreads a computational load over a server farm or cloud computing structure. Many other configurations are possible.

In such examples, each of the computing devices communicates with the other computing devices through the network 106. The network 106 can be any suitable data network, such as the Internet, a wide area network, a local area network, a wired network, a wireless network, a cellular network, a satellite network, a near field communication network, or any operatively connected combination of these.

In the example shown, the server computing device 108 is programmed to facilitate the integrated property and lending search experience. For instance, the server computing device 108 can be programmed to allow buyers to search for homes and/or loans used to purchase the homes. The server computing device 108 can provide information to the buyer computing device 102 and the seller computing device 104 to facilitate those searches and purchases.

More specifically, in the example shown, the server computing device 108 is maintained by an institution, such as a real estate institution that facilitates the sale of homes and/or a financial institution that facilitates loans (e.g., mortgages) for the purchase of those homes. The server computing device 108 accesses home information and loan information from the databases 110, 112 to facilitate a buyer's search for a home and the seller's sale of a home.

In the examples shown, the database 110 includes property information and the database 112 includes loan information. In alternative embodiments, the databases 110, 112 can be combined into a single database. In yet other embodiments, one or both of the databases 110, 112 include a distributed architecture across multiple computing devices and/or storage devices. Many configurations are possible.

Figure 2:
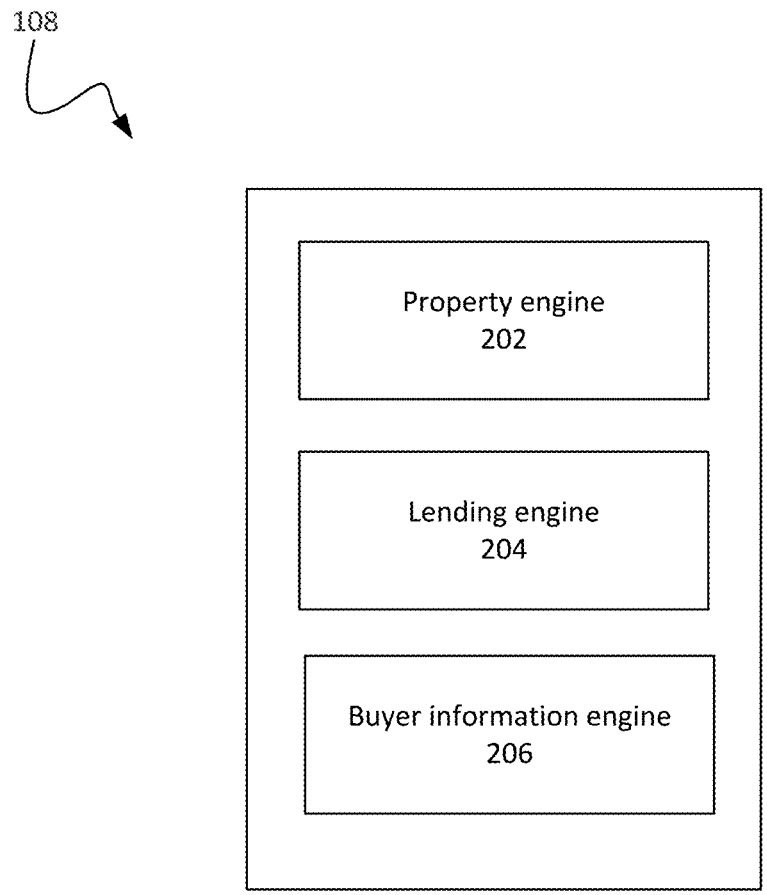
FIG. 2 shows logical components of an example server of the system of FIG. 1.

Referring now to FIG. 2, additional details about the example server computing device 108 are shown. In this instance, the server computing device 108 includes a property engine 202, a lending engine 204, and an optional buyer information engine 206. Many other configurations are possible.

The example property engine 202 is programmed to facilitate the search for homes by a buyer. In this embodiment, the property engine 202 communicates with the database 110 to access data associated with homes that are for sale. For example, the property engine 202 can receive one or more parameters from the buyer through the buyer computing device 102 and generate a series of Structured Query Language (SQL) commands or similar functionality to access data stored in the database 110 associated with homes for sale.

The example lending engine 204 is programmed to facilitate the search for loans by a buyer. In this embodiment, the loans are mortgages for the purchase of the home. The lending engine 204 can communicate with the database 112 to access data associated with loans that can be used to purchase homes. For example, the lending engine 204 can receive one or more parameters from the buyer through the buyer computing device 102 and generate a series of SQL commands or similar functionality to access data stored in the database 112 associated with loans.

In this example, the property engine 202 and the lending engine 204 function in tandem to facilitate the search for a home and a loan by the buyer associated with the buyer computing device 102. More specifically, the server computing device 108 can be programmed to request one or more parameters from the buyer, although some embodiments described herein do not need any parameters to be provided by the buyer.

In these examples, the parameters can include aspects of the home purchase that the buyer may find important, such as a down payment amount (e.g., an amount (such as a percentage of the home's purchase price) that is paid when the home loan is closed) and/or a monthly payment amount for the desired home (e.g., the amount the buyer pays the lender each month to repay the home loan). Furthermore, the parameters can be explicitly provided by the buyer or implicitly filled in based on prior knowledge of information associated with the buyer, as described further below.

These example parameters are passed to the property engine 202 and the lending engine 204. The property engine 202 and the lending engine 204 conduct searches that identify homes and loans that meet the requirements associated with the parameters. The results of these searches can be served by the server computing device 108 back to the buyer computing device 102 for display to the buyer.

As described further below, the results can be presented based upon aspects of the parameters received from the buyer. For example, the results can be presented with each potential home showing the associated parameters, such as the down payment amount and/or the monthly payment amount associated with that home. In this manner, the search for the home and loan to purchase the home are combined into an integrated experience. See, e.g., FIGS. 3-7.

Further, in some embodiments, the lending engine 204 is further programmed to facilitate the actual sale of the home from the seller to the buyer. In these examples, the lending engine 204 communicates with both the buyer computing device 102 and the seller computing device 104 to capture and confirm information, facilitate execution of purchase documents, and distribute the loan proceeds when appropriate. In this manner, the purchase of the home is streamlined for both the buyer and the seller. See, e.g., FIGS. 8-11.

The example optional buyer information engine 206 of FIG. 2 is programmed to provide additional context to the searching and/or the purchase of the home. For instance, the buyer information engine 206 can be programmed to prepopulate, or otherwise minimize, input from the buyer and/or the seller that is necessary for the searching and/or purchase of the home.

In this embodiment, the buyer information engine 206 can be programmed to access information associated with the buyer and provide that information to facilitate the functionality of the server computing device 108. For example, the buyer information engine 206 may authenticate the buyer or otherwise obtain information about the buyer. This can be accomplished, for instance, when the buyer is already a customer associated with the institution (e.g., lending institution). In such a scenario, the buyer information engine 206 can access information such as the buyer's location, financial condition, etc.

In some examples, the buyer may be a customer of the institution, such as a financial institution. The financial institution may therefore already have information about the buyer, such as the buyer's location. The financial institution can also have information associated with the buyer's financial condition, such as the buyer's income, credit score, accounts, assets, etc. Further, the financial institution can, with proper permission from the buyer, access such information from third party systems, as desired.

The buyer information engine 206 can use this information to facilitate the functionality of the property engine 202 and/or the lending engine 204. For example, the buyer information engine 206 can access the current location of the buyer and automatically show homes in that location. Further, the buyer information engine 206 can access financial information associated with the buyer and automatically prepopulate that information as the buyer searches. This can include prepopulating the parameters associated with the down payment amount and/or the monthly payment amount based upon the financial information accessed by the server computing device 108. As described further below, the buyer can change this prepopulated information in certain instances.

In some examples, the property engine 202, the lending engine 204, and/or the buyer information engine 206 store the information necessary to facilitate the functionality of the server computing device 108 according to a logical architecture that includes a contextual design that defines a context (e.g., document context, customer context, or loan context) for each data point. This architecture can include a common decisioning solution with one or more of: (i) pre-decisioning, which creates a dynamic application that leverages existing knowledge to more efficiency provide home and loan searching to a customer; and (ii) a context engine that defines contextual relationships between items in a model, thereby allowing changes to be made and reflected appropriately throughout the model.

Examples of such a logical architecture are described in U.S. patent application Ser. No. 16/940,728 filed on Jul. 28, 2020, U.S. patent application Ser. No. 17/204,442 filed on Mar. 17, 2021, and U.S. patent application Ser. No. 17/204,583 filed on Mar. 17, 2021, the entireties of which are hereby incorporated by reference.

Referring now to FIGS. 3-6, example user interfaces are shown. The example interfaces can be generated by the server computing device 108 and rendered on the buyer computing device 102. Generally, the interfaces can be configured to facilitate the integrated property and lending search experience using the system 100.

Figure 3:
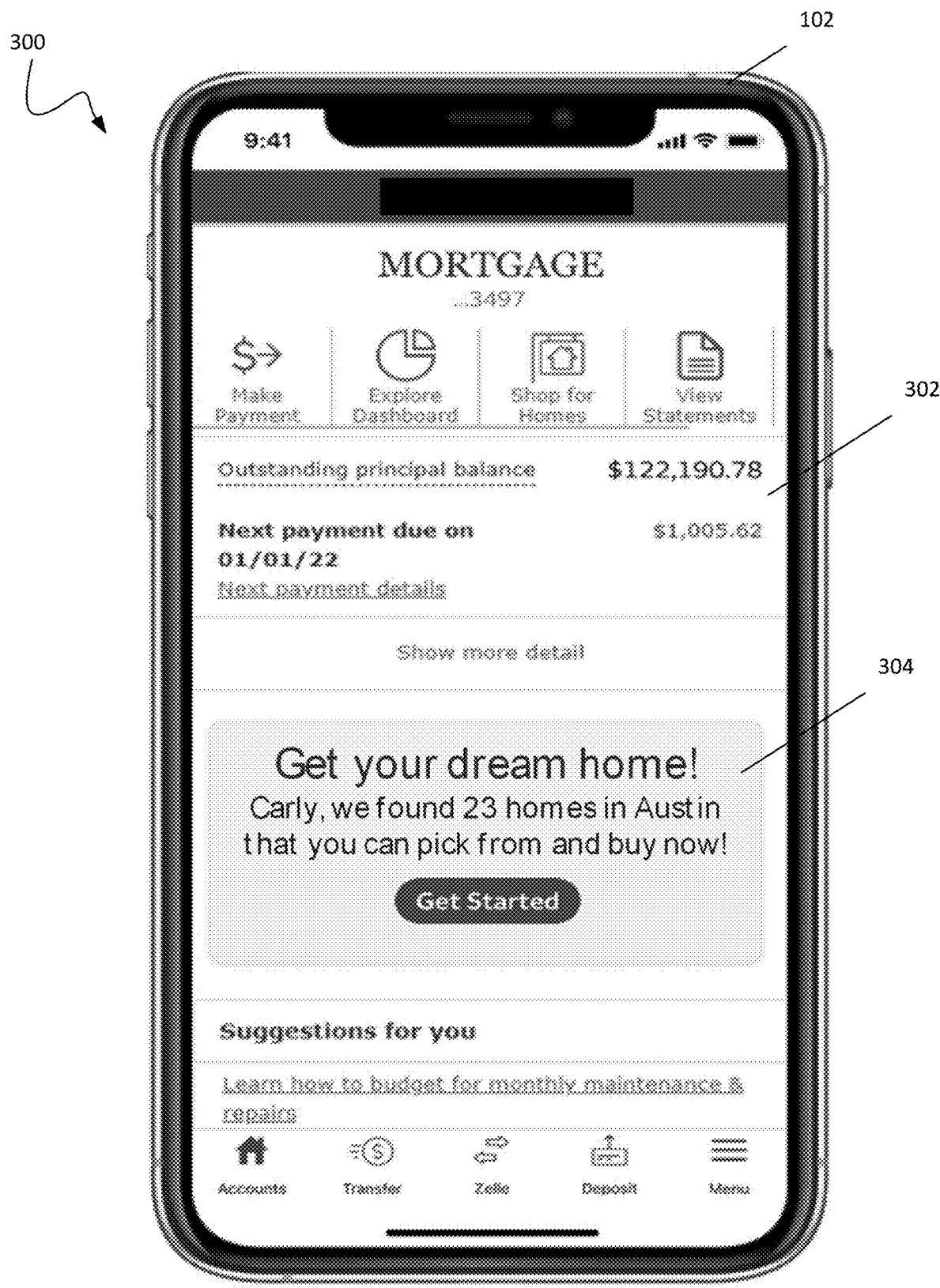
FIG. 3 shows an example user interface generated by the server of FIG. 2.

Referring specifically to FIG. 3, an example interface 300 shows one example way such a property and lending search experience can be initiated. In this embodiment, the buyer computing device 102 executes a mobile application that presents information associated with the buyer's assets. For instance, in this embodiment, the buyer can be authenticated in a mobile financial services application on the buyer computing device 102, and the interface 300 includes a section 302 providing information about the accounts for the buyer. In the example, the account listed can be a loan (e.g., existing mortgage, personal loan, etc.), and the information provided includes an outstanding balance and next payment amount for the loan.

The example interface 300 also includes a section 304 that displays information associated with a possible property and lending search experience. In this example, the section 304 includes information about the search, such as indicating that the system 100 can be used to find a new home.

The section 304 can also, in some examples, prepopulate certain information associated with the search, such as the location. This can be determined based upon context. For instance, as described above, the buyer information engine 206 can use information known about the buyer, such as location, to determine the prepopulated location. Other contexts, such as a location of the buyer computing device 102, can be used. For example, in FIG. 3 the section 304 is illustrated as displaying "Carly, we found 23 homes in Austin that you can pick from and buy now!". Within this display, the name, "Carly", the number of home search results, "23" homes, and the location, "Austin", may each be prepopulated and unique to the buyer. Many configurations are possible.

Further, this is just one of numerous ways the integrated property and lending search experience can be initiated. For instance, in alternative embodiments, a request can be received from the buyer through the buyer computing device 102 indicating that the buyer wishes to search for a home and/or loan. In other examples, various other contexts or activities identified by the system 100 can generate the integrated property and lending search experience. For example, the system 100 can use information associated with the buyer, such as a determined increase in income, to display the section 304 and/or initiate the integrated property and lending search experience for the buyer.

Figure 4:
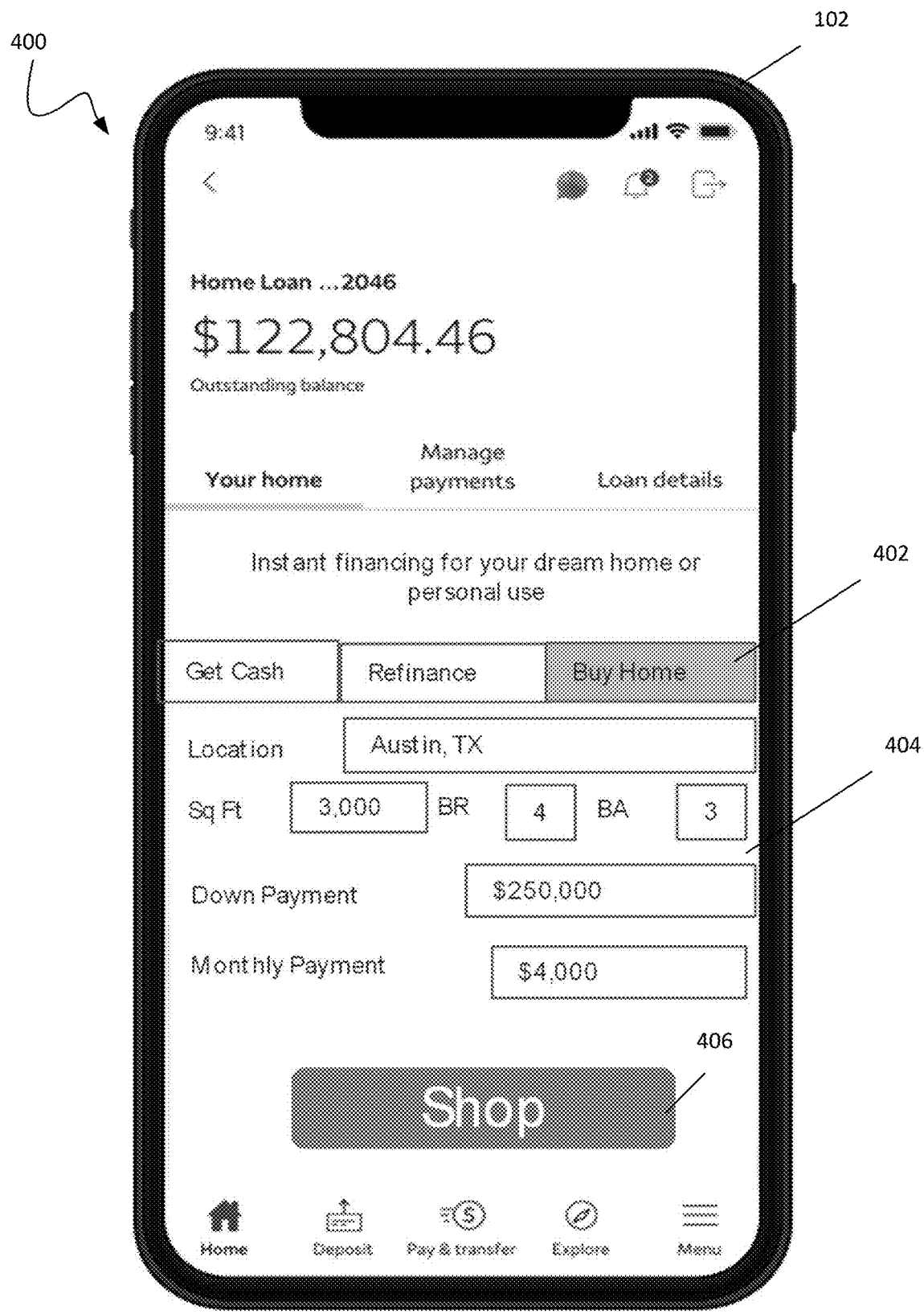
FIG. 4 shows another example user interface generated by the server of FIG. 2.

Referring now to FIG. 4, upon receipt of selection of the section 304, the property engine 202 and the lending engine 204 generate an example interface 400, including a search section 402 and a parameters section 404. Alternatively, the property engine 202 and the lending engine 204 may generate the example interface 400 in response to selection of a "Shop for Homes" icon in the example interface 300. For instance, the example interface 300 may display the "Shop for Homes" icon in a menu bar, along with other icons for financial services functionality within a mobile application (e.g., Make Payment, Explore Dashboard, View Statements, etc.)

As illustrated in FIG. 4, the search section 402 defines different types of searches that are available. In this example, a "Buy Home" tab is selected, which initiates the property and lending search experience. Other types of searches can include, without limitation, accessing equity in an existing home ("Get Cash") and refinancing an existing mortgage.

With the "Buy Home" tab of the search section 402 selected, the parameters section 404 defines the parameters that are used for the integrated property and lending search experience. Examples of the parameters that are captured by the parameters section 404 can vary. In this example, parameters associated with the home are provided, including a location field, a square footage field, a number of bedrooms field, and/or a number of bathrooms field. It other embodiments, only the location need be specified.

The example parameters section 404 also includes a down payment field and a monthly payment field. These fields allow a buyer to define a desired down payment and/or a desired monthly payment to be used during the integrated property and lending search experience. In some examples, the down payment and monthly payment amounts, if specified, are used as maximum values, as described further below.

In this embodiment, some or all the parameters provided in the fields of the search section 402 can be prepopulated by the buyer information engine 206. For instance, information associated with a home currently owned by the buyer can be used to make assumptions on the aspects of the next desired home. For example, the buyer information engine 206 can be programmed to assume that the buyer would want an increase in square footage and/or number of bedrooms or bathrooms in a new home.

Further, the down payment and/or the monthly payment fields can be prepopulated with amounts based upon the financial condition known about the buyer. For instance, an existing mortgage and/or income information can be used to initially set the amounts in the down payment and/or the monthly payment fields.

If any of the fields are pre-populated with information, the parameters section 404 allows for input to be received from the buyer computing device 102 by the buyer. For instance, if the buyer information engine 206 initially prepopulates a certain down payment amount in the parameters section 404, input from the buyer computing device 102 can change the amount as desired by the buyer.

The parameters in the parameters section 404 allow the server computing device 108 to initiate the home and lending search as an integrated experience, rather than requiring the buyer to separately conduct searches for (i) a home and (ii) a loan to purchase the home.

In the embodiment shown, the parameters section 404 can be programmed to only require the buyer to indicate a desired down payment and/or a desired monthly payment to initiate the integrated property and lending search experience. The parameters section 404 does not require the buyer to define a desired purchase price for the home, as the amount of the down payment and/or the monthly payment may be more important parameters to the buyer. In other words, the lending engine 204 can be programmed to search for loans based solely upon the down payment amount and/or the monthly payment amount, rather than other parameters such as, without limitation, a home price.

Not all the fields of the parameters section 404 need to be populated to initiate the property and lending search experience. For example, as noted, it is not necessary that the square footage field or the bedroom and bathroom fields be filled in to initiate the search. Once the desired fields in the parameters section 404 are filled, a control 406 is selectable by the buyer to initiate the search.

Upon receipt of selection of the control 406 (labelled in FIG. 4 as "Shop") from the buyer computing device 102, the property engine 202 and the lending engine 204 can be programmed to query the databases 110, 112 according to the parameters defined in the parameters section 404. Based upon the results of these queries, the server computing device 108 can identify both homes and associated loans that meet the buyer's criteria.

More specifically, the property engine 202 queries the database 110 using the parameters associated with the home, such as one or more of location, square footage and/or number of bedrooms or bathrooms. The database 110 returns homes that meet the defined parameters. Similarly, the lending engine 204 queries the database 112 using the parameters associated with the amounts for the down payment and/or the monthly payment. The database 112 returns loans that meet the defined parameters.

The property engine 202 and the lending engine 204 process the returned results to identify those homes and associated loans that meet the desired parameters. For instance, the property engine 202 and the lending engine 204 can match loans having the desired down payment and/or monthly payment with homes that can support that down payment and/or monthly payment based upon the purchase prices for those homes. The results include homes that are matched with loans that can be used to purchase the homes. This results in the integrated experience combining the search for a home and a loan.

Figure 5:
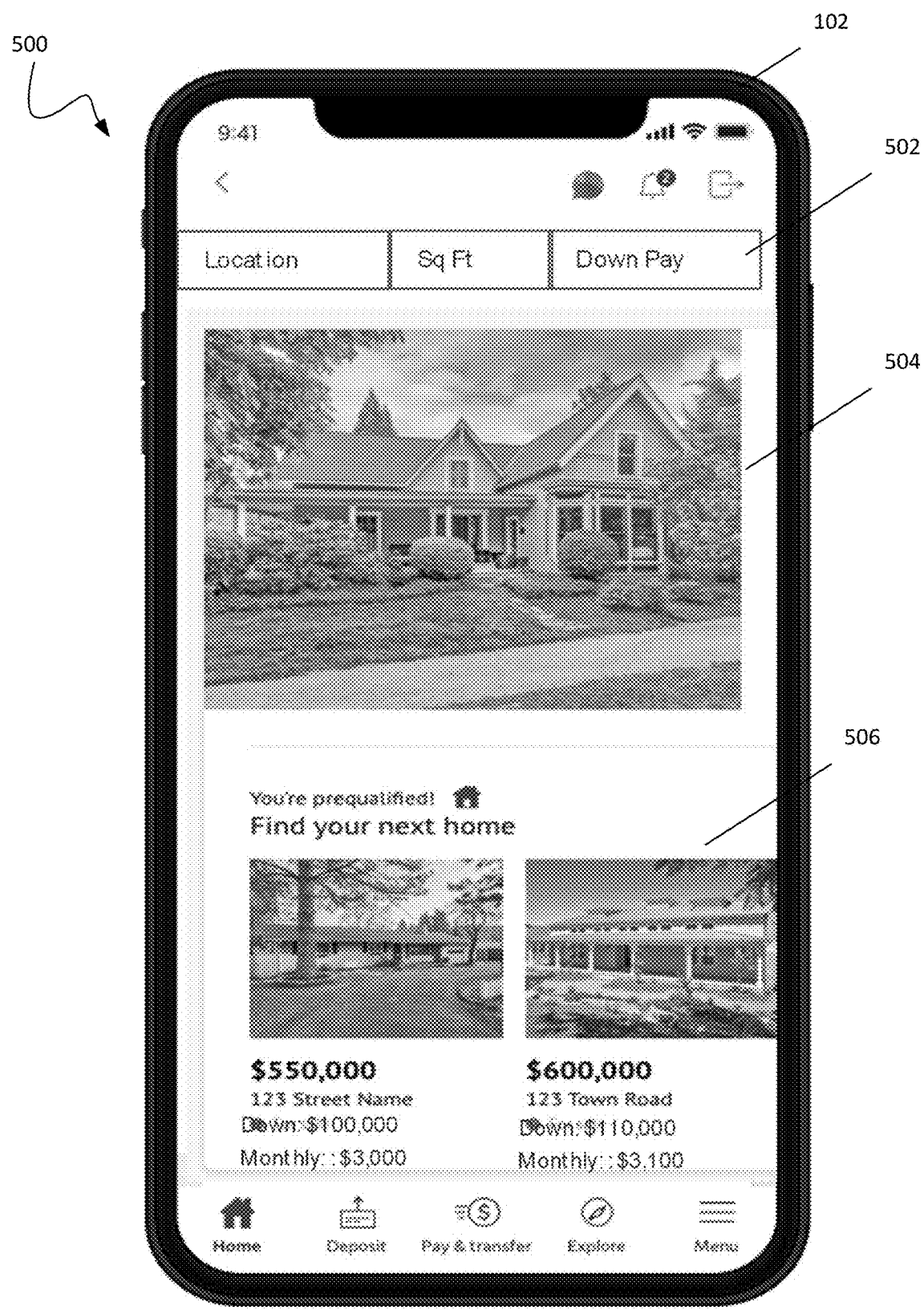
FIG. 5 shows another example user interface generated by the server of FIG. 2.

Referring now to FIG. 5, the server computing device 108 can generate an interface (e.g., example interface 500) for display on the buyer computing device 102. In this embodiment, the interface 500 can include a filter section 502, a selected home section 504, and an alternative homes section 506.

In this embodiment, the interface 500 generally displays information about the one or more homes and loans that meet the desired parameters. In this example, the buyer can be prequalified to purchase the homes shown on the interface 500 based upon the information received from the buyer through the buyer computing device 102 or from the optional buyer information engine 206.

The example filter section 502 is programmed to filter or sort the homes and loans shown in the interface 500 according to various preferences. For instance, the filter section 502 in this example includes preferences including: location of home; size of home (square footage); and down payment amount. Other criteria can also be used, such as monthly payment amount.

Upon receipt of selection of one or more of the preferences in the filter section 502 from the buyer through the buyer computing device 102, the interface 500 is modified to show homes and loans meeting the filtered preferences. For instance, when the system 100 receives selection of the down payment criteria in the filter section 502 from the buyer, the homes shown in the interface 500 can be sorted according to an amount for the down payment. Further, the filter section 502 can be programmed in an alternative embodiment to accept input of a refined down payment amount or range of amounts and filter out those homes not meeting the refined down payment amount. Many configurations are possible.

The example selected home section 504 shows images and/or video associated with the home selected by the server computing device 108 for the buyer. Receipt of selection of the home by the buyer through the buyer computing device 102 causes the server computing device 108 to load an interface 600 shown in FIG. 6, which is described below.

The alternative homes section 506 of FIG. 5 shows other homes and associated loans that may meet the specified parameters of the parameters section 404. Each of the listed homes and associated loans includes images and/or video, along with address and pricing information. In the examples shown, the pricing information includes amounts for down payment and/or monthly payment.

As described above, the amounts for the down payment and the monthly payment specified, for example, in the parameters section 404 of interface 400, can be maximum values. Accordingly, only homes with associated loans having down payments and monthly payments at or less than these parameters can be shown in the alternative homes section 506.

Further, the amounts for the down payment and/or the monthly payment shown for each home in the alternative homes section 506 can be adjusted based upon the purchase price for each respective home. For instance, the down payment amount can be adjusted down, proportionally, to approximately twenty (20) percent of the purchase price for a home shown in the alternative homes section 506. Receipt of adjustments to these parameters can be received from the buyer through the buyer computing device 102, as described further below.

For example, FIG. 5 illustrates two different properties in the alternative homes section 506. The first property has a listed price of $550,000 and an address of 123 Street Name. The alternative homes section 506 shows a down payment amount of $100,000 and a monthly payment amount of $3,000 for the first property. Notably, these parameters are specific to the first property, and are less-than the down payment and monthly payment specified in the parameters section 404 of interface 400. The second property illustrated in alternative homes section 506 has a list price of $600,000 and an address of 123 Town Road. The alternative homes section 506 shows a down payment amount of $110,000 and a monthly payment amount of $3,100 for the second property. Notably, these parameters are also less-than the down payment and monthly payment specified in the parameters section 404 of interface 400.

In various examples, the buyer may navigate through multiple alternative properties (and their corresponding parameters) by scrolling through the alternative homes section 506. That is, FIG. 5 only illustrates two properties in the alternative homes section 506 for the convenience of illustration. In various other examples, all results may be displayed in the alternative homes section 506, and the buy may scroll up, down, left, right, etc. to navigate through all of the results (and/or filtered results).

Figure 6:
FIG. 6 shows another example user interface generated by the server of FIG. 2.
Figure 7:
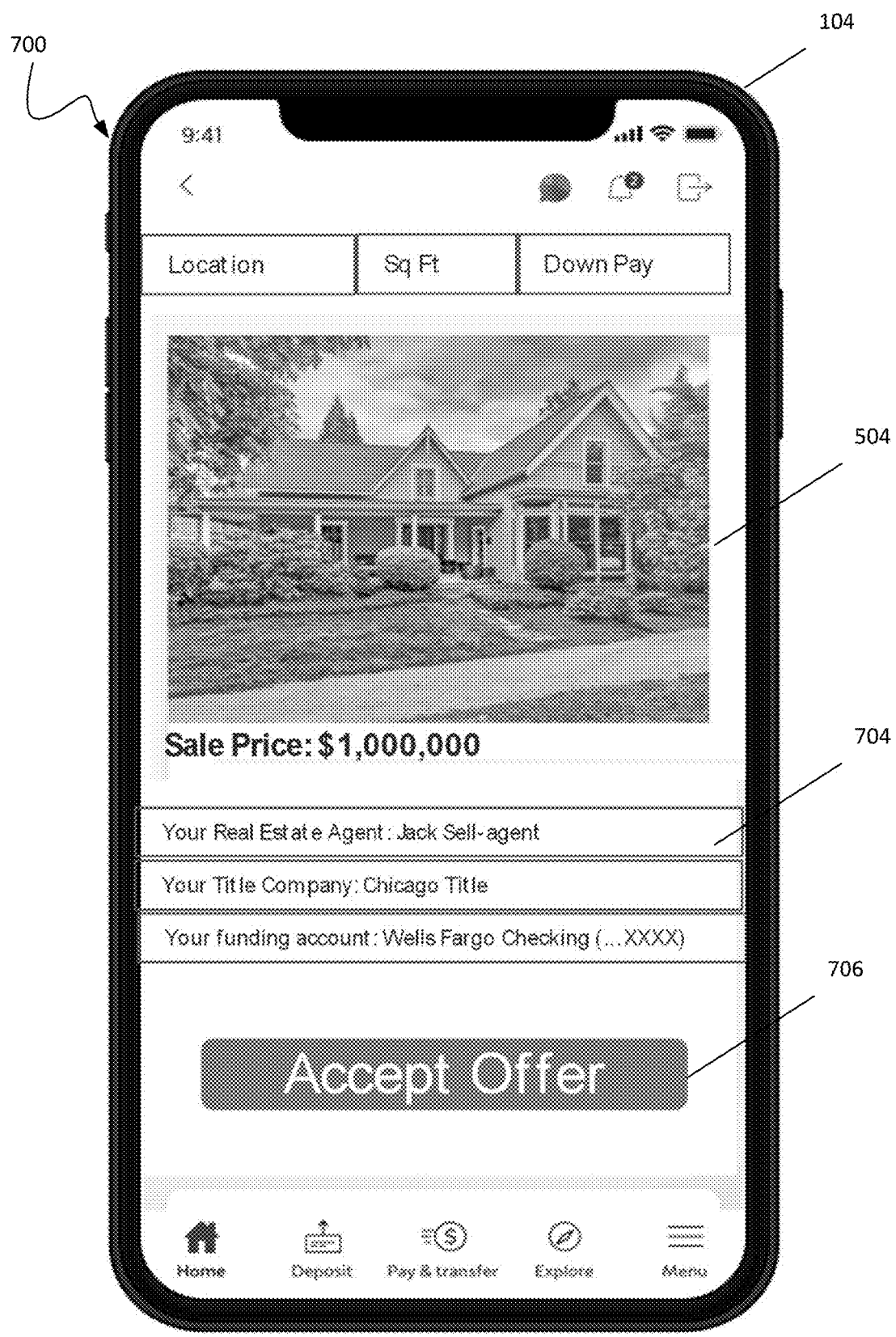
FIG. 7 shows another example user interface generated by the server of FIG. 2.

Once the server computing device 108 receives selection of one of the homes and associated loans shown on the interface 500 from the buyer through the buyer computing device 102, the server computing device 108 generates the interface 600 shown in FIG. 6.

The example interface 600 includes a pricing information section 602 that provides amounts for the down payment and the monthly payment. As noted, these amounts can be adjusted based upon the purchase price for the home and/or input received from the buyer through the buyer computing device 102. In any event, the down payment and monthly payment shown in the pricing information section 602 are equal-to or less-than the down payment and monthly payment specified in the parameters section 404 of interface 400.

The interface 600 can also include a contact section 604 that lists the relevant contacts associated with the potential sale of the home. This can include, without limitation, the buyer's mortgage consultant, the buyer's real estate agent, the title company, the appraiser, and/or the property insurer. In some examples, the contacts listed in the contact section 604 can be contacted (e.g., via telephone or text message) upon receipt of selection of one of the contacts.

The interface 600 can also include a control 606 (illustrated as "Make Offer") that generates an offer to purchase the home upon receipt of selection of the control 606. Again, as shown in this example, the focus of the offer can be on the amounts of the down payment and monthly payment associated with a loan for the home, rather than focusing on the purchase price.

Should the server computing device 108 receive indication of selection of the control 606, a message is generated to the appropriate contacts in the contact section 604 to initiate a buy offer to the seller of the home.

Referring now to FIGS. 7-10, additional example user interfaces are shown. The example interfaces can be generated by the server computing device 108 and rendered on the buyer computing device 102 and the seller computing device 104. Generally, the interfaces can be configured to consummate an offer to purchase a home using the system 100.

For instance, once the server computing device 108 receives receipt of selection of the control 606 by the buyer through the buyer computing device 102, the system 100 generates an interface 700 for rendering on the seller computing device 104 to provide the seller with the offer.

The example interface 700 can include a contact section 704 that lists the relevant contacts associated with the potential sale of the home. This can include, without limitation, the seller's real estate agent, the title company, and/or account information to receive the funding associated with the sale of the home. In some examples, the contacts listed in the contact section 704 can be contacted (e.g., via telephone or text message) upon receipt of selection of one of the contacts.

The interface 700 can also include a control 706 that generates an acceptance to the offer to purchase the home upon receipt of selection of the control 706 (shown as "Accept Offer") by the seller through the seller computing device 104.

Should the server computing device 108 receive indication of selection of the control 706, a message is generated to the appropriate contacts in the contact section 704 to initiate sale of the home.

Figure 8:
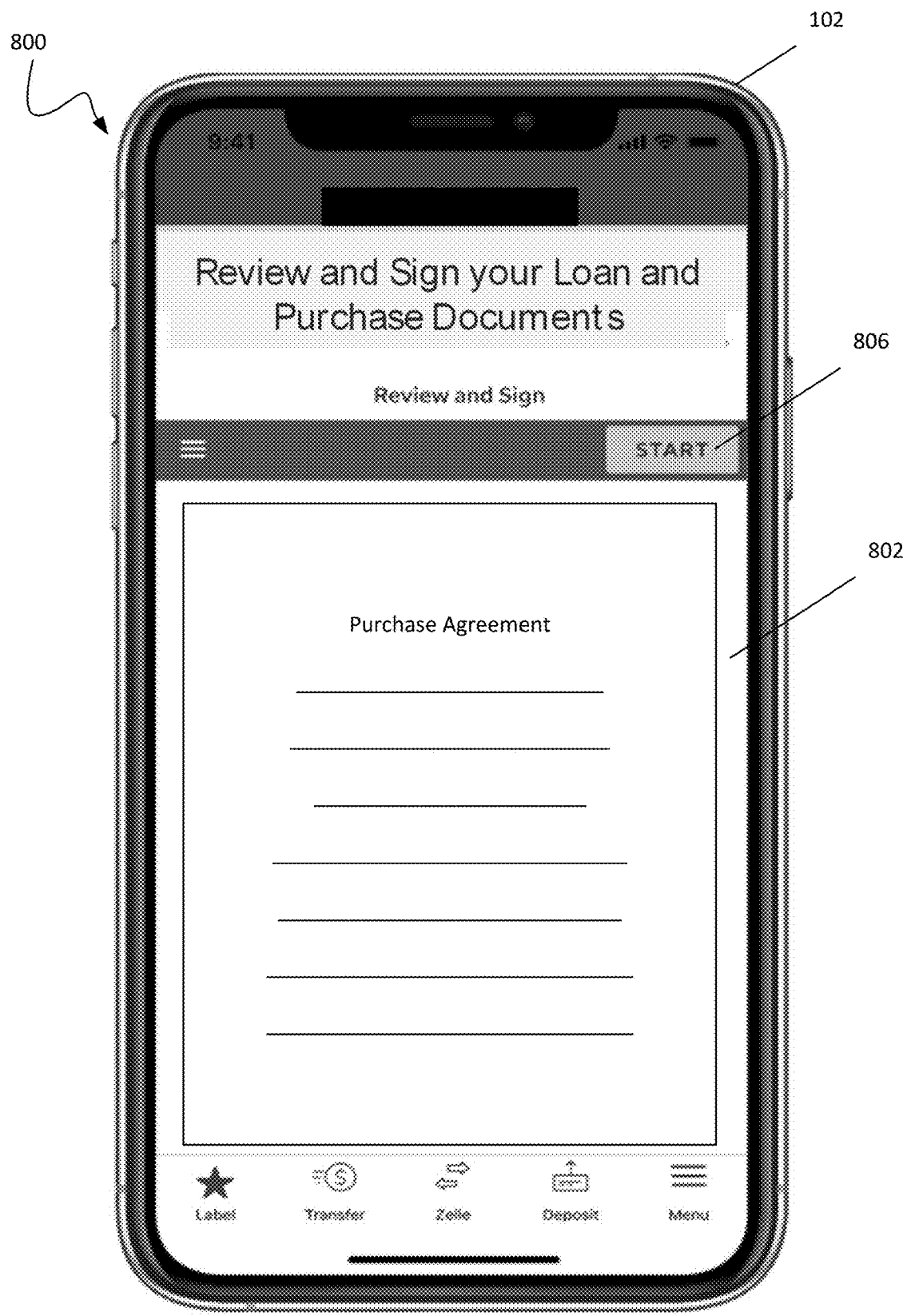
FIG. 8 shows another example user interface generated by the server of FIG. 2.
Figure 9:
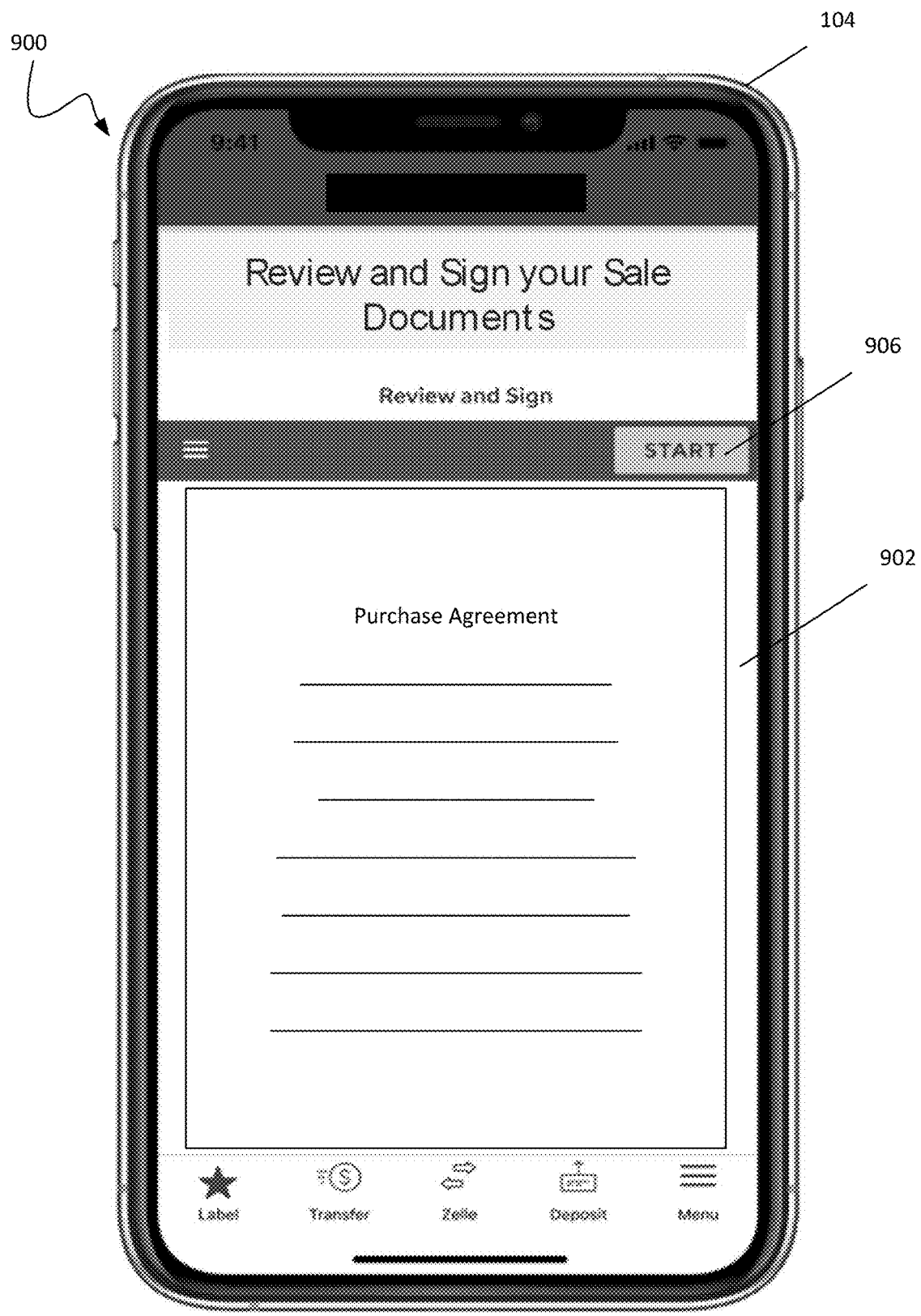
FIG. 9 shows another example user interface generated by the server of FIG. 2.

Referring now to FIGS. 8-9, in some embodiments, the purchase of the home is also facilitated by the system 100.

Specifically, an example interface 800 shown in FIG. 8 is generated by the server computing device 108. The interface 800 can provide purchase documentation for the buyer on the buyer computing device 102.

In the example shown, the interface 800 includes a documentation section 802 that provides a view of the documentation necessary for purchase, such as the purchase agreement. A control 806 facilitates review and execution of the purchase documents by the buyer using the buyer computing device 102. For instance, the interface 800 can allow for confirmation of review and execution of the purchase documents by the buyer through the buyer computing device 102.

Similarly, an example interface 900 shown in FIG. 9 can provide purchase documentation for the seller on the seller computing device 104.

In the example shown, the interface 900 includes a documentation section 902 that provides a view of the documentation necessary for purchase, such as the purchase agreement. A control 906 facilitates review and execution of the purchase documents by the seller using the seller computing device 104. For instance, the interface 900 can allow for confirmation of review and execution of the purchase documents by the seller through the seller computing device 104.

In these examples, the interfaces 800 and 900 can be optimized for display on the buyer computing device 102 and the seller computing device 104. For instance, the interfaces 800 and 900 can allow for easier review of the purchase documents on smaller screens typically associated with mobile devices and can allow for easier input (e.g., execution of signatures) on such mobile devices.

Figure 10:
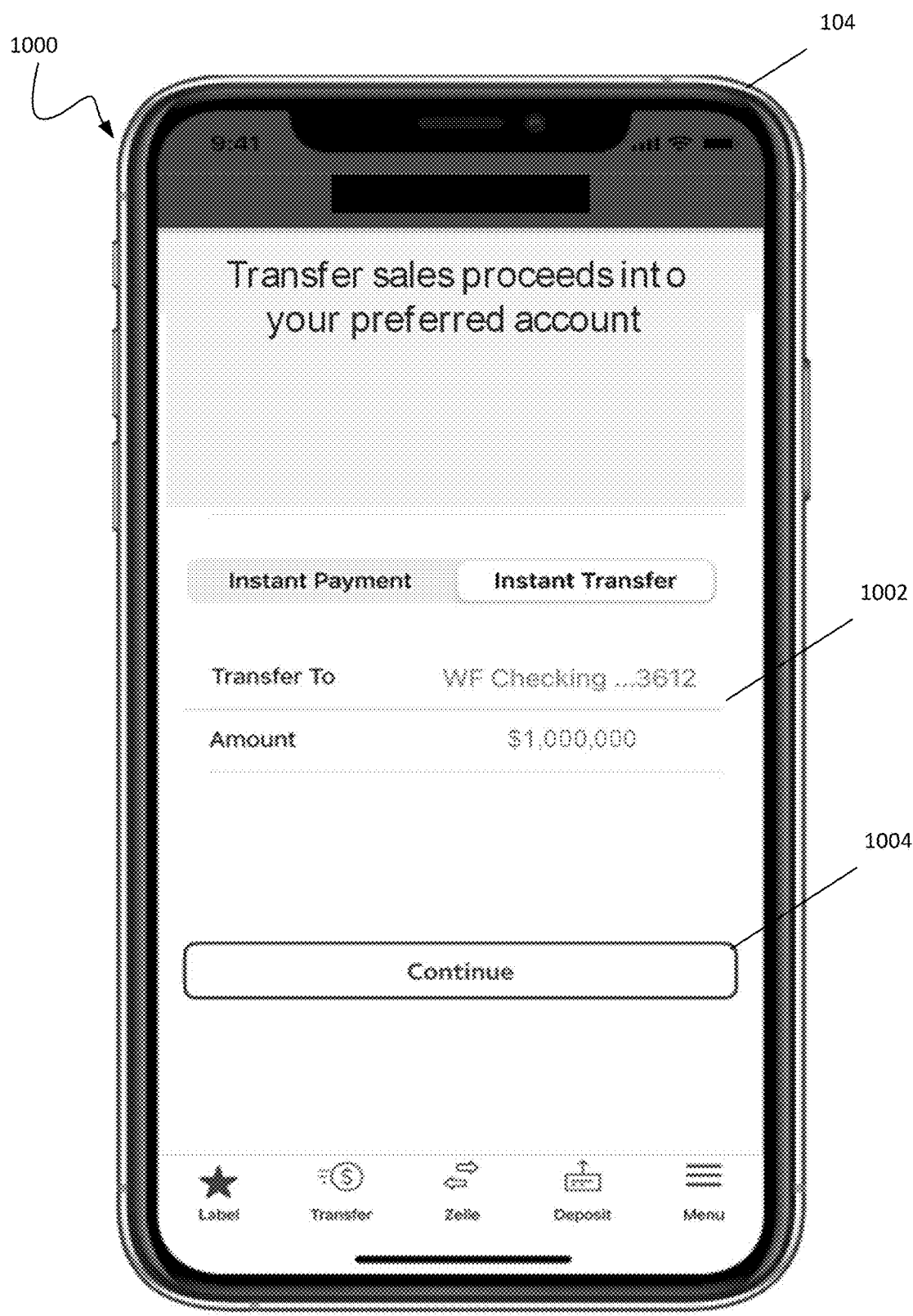
FIG. 10 shows another example user interface generated by the server of FIG. 2.

Referring now to FIG. 10, another example interface 1000 generated by the server computing device 108 and rendered on the seller computing device 104 is shown. The interface 1000 can include an account section 1002 that identifies an account where the proceeds from the sale of the home are to be deposited. For instance, in this example, a checking account is identified for receipt of the funds. The server computing device 108 is programmed to transfer the proceeds into the account defined in the account section 1002 upon receipt of selection of a control 1004 though the seller computing device 104 by the seller. Many other configurations are possible.

While the examples provided herein describe searching and purchasing a home, other types of properties and loans can be equally applicable to the integrated property and lending search experience described herein. For instance, in another example, commercial properties and commercial loans can be used. In yet another possible example, automobiles and automobile loans can be used in conjunction with the integrated property and lending search experience. Many other configurations are possible.

FIG. 11 schematically shows example components of portions of the system 100 of FIG. 1. In particular, additional components of the server computing device 108 are illustrated. In this example, the server computing device 108 provides the computing resources to perform the functionality associated with the system 100. The other computing devices associated with the system 100 can be similarly configured.

The server computing device 108 includes a central processing unit or processor 1102, a system memory 1108, and a system bus 1122 that couples the system memory 1108 to the processor 1102.

The system memory 18 includes a random access memory ("RAM") 1110 and a read-only memory ("ROM") 1112. A basic input/output system that contains the basic routines that help to transfer information between elements within the server computing device 108, such as during startup, is stored in the ROM 1112.

The server computing device 108 further includes a mass storage device 1114. The mass storage device 1114 is able to store software instructions and data.

The mass storage device 1114 is connected to the processor 1102 through a mass storage controller (not shown) connected to the system bus 1122. The mass storage device 1114 and its associated computer-readable data storage media provide non-volatile, non-transitory storage for the server computing device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computing device 108.

According to various embodiments of the invention, the server computing device 108 may operate in a networked environment using logical connections to remote network devices through the network 106, such as a wireless network, the Internet, or another type of network. The server computing device 108 may connect to the network 106 through a network interface unit 1104 connected to the system bus 1122. It should be appreciated that the network interface unit 1104 may also be utilized to connect to other types of networks and remote computing systems.

The server computing device 108 also includes an input/output unit 1106 for receiving and processing input from a number of other devices, including a touch user interface display screen, an audio input device, or another type of input device. Similarly, the input/output unit 1106 may provide output to a touch user interface display screen or other type of output device.

As mentioned briefly above, the mass storage device 1114 and/or the RAM 1110 of the server computing device 108 can store software instructions and data. The software instructions include an operating system 1118 suitable for controlling the operation of the server computing device 108. The mass storage device 1114 and/or the RAM 1110 also store software instructions and applications 1116, that when executed by the processor 1102, cause the server computing device 108 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for generating an integrated property and lending search experience, the system comprising:
   at least one processor; and
   memory encoding instructions which, when executed by the at least one processor, cause the system to:
      determine current financial information associated with a buyer by automatically accessing one or more financial aspects of a current financial condition of the buyer;
      generate an integrated property and lending user interface for display on a user device of the buyer, the integrated property and lending user interface including a buyer account section and a search parameter section, wherein:
         the buyer account section includes the current financial information associated with the buyer; and
         the search parameter section includes home parameters and loan parameters;
      automatically prepopulate at least a first portion of the loan parameters based on the current financial information, the first portion of the loan parameters including a down payment amount and/or a monthly payment amount based upon the current financial information about the buyer including an existing mortgage on an existing home, wherein automatically prepopulating at least the first portion of the loan parameters comprises to:
         analyze the existing mortgage of the buyer to determine current down payment and monthly payment amounts; and
         set the first portion of the loan parameters based on the current down payment and monthly payment amounts;
      automatically analyze current home physical information associated with the existing home currently owned by the buyer to determine physical aspects of a new home, wherein the physical aspects include at least one of square footage, number of bedrooms, and number of bathrooms;
automatically prepopulate at least a second portion of the home parameters based on the current financial information, the second portion of the home parameters including an increase in a size over the existing home, wherein automatically prepopulating at least the second portion of the home parameters comprises to:
  determine that the buyer wants an increase in at least one of the physical aspects in the new home compared to the existing home currently owned by the buyer; and
  set the second portion of the home parameters based on the determined increase;
receive, at the integrated property and lending user interface, at least a portion of the home parameters and/or the loan parameters, wherein the integrated property and lending user interface is configured to allow for modification of the first portion and the second portion;
search for homes meeting the home parameters;
search for loans meeting the loan parameters, the loan parameters including the down payment amount and/or the monthly payment amount; and
display information about one or more homes meeting both the home parameters and the loan parameters on the integrated property and lending user interface, wherein the integrated property and lending user interface is configured to:
  provide a filter control section with controls programmed to allow for controlling filtering of the one or more homes;
  generate a selected home section including information about a selected home of the one or more homes; and
  generate an alternative home section including information about alternative homes of the one or more homes, wherein the alternative home section is programmed to allow for scrolling between the alternative homes.

2. The system of claim 1, comprising further instructions which, when executed by the at least one processor, cause the system to search for the loans based solely on the down payment amount or the monthly payment amount.

3. The system of claim 1, comprising further instructions which, when executed by the at least one processor, cause the system to:
  identify the one or more homes meeting the home parameters;
  identify one or more loans meeting the loan parameters; and
  identify the one or more homes meeting both the home parameters and the loan parameters.

4. The system of claim 1, wherein the information about the one or more homes includes the down payment amount or the monthly payment amount for each of the one or more homes.

5. The system of claim 1, comprising further instructions which, when executed by the at least one processor, cause the system to facilitate a purchase of one of the one or more homes.

6. The system of claim 5, comprising further instructions which, when executed by the at least one processor, cause the system to:
  enable the buyer to make an offer for a specific home from the one or more homes;
  upon receipt of the offer by the buyer, initiate an offer message to a seller of the specific home which enables the seller to accept the offer; and
  upon acceptance of the offer by the seller, initiate an acceptance message notifying the buyer, the seller, and other parties associated with a sale of the specific home.

7. The system of claim 5, comprising further instructions which, when executed by the at least one processor, cause the system to allow for execution of documents for the purchase to the buyer and a seller.

8. The system of claim 1, comprising further instructions which, when executed by the at least one processor, cause the system to receive account information from a seller for receipt of funds associated with a purchase of one of the one or more homes.

9. A method of providing an integrated property and lending search experience, the method comprising:
  determining current financial information associated with a buyer by automatically accessing one or more financial aspects of a current financial condition of the buyer;
  generating an integrated property and lending user interface for display on a user device of the buyer, the integrated property and lending user interface including a buyer account section and a search parameter section, wherein:
    the buyer account section includes the current financial information associated with the buyer; and
    the search parameter section includes home parameters and loan parameters;
  automatically prepopulating at least a first portion of the loan parameters based on the current financial information, the first portion of the loan parameters including a down payment amount and/or a monthly payment amount based upon the current financial information about the buyer including an existing mortgage on an existing home, wherein automatically prepopulating at least the first portion of the loan parameters comprises:
    analyzing the existing mortgage of the buyer to determine current down payment and monthly payment amounts; and
    setting the first portion of the loan parameters based on the current down payment and monthly payment amounts;
  automatically analyzing current home physical information associated with the existing home currently owned by the buyer to determine physical aspects of a new home, wherein the physical aspects include at least one of square footage, number of bedrooms, and number of bathrooms;
  automatically prepopulating at least a second portion of the home parameters based on the current financial information, the second portion of the home parameters including an increase in a size over the existing home, wherein automatically prepopulating at least the second portion of the home parameters comprises:
    determining that the buyer wants an increase in at least one of the physical aspects in the new home compared to the existing home currently owned by the buyer; and
    setting the second portion of the home parameters based on the determined increase;
  receiving, at the integrated property and lending user interface, at least a portion of the home parameters and/or the loan parameters, wherein the integrated property and lending user interface is configured to allow for modification of the first portion and the second portion;

searching for homes meeting the home parameters;

searching for loans meeting the loan parameters, the loan parameters including the down payment amount and/or the monthly payment amount; and displaying information about one or more homes meeting both the home parameters and the loan parameters, including:

provisioning a filter control section with controls programmed to allow for controlling filtering of the one or more homes;

generating a selected home section including information about a selected home of the one or more homes; and generating an alternative home section including information about alternative homes of the one or more homes, wherein the alternative home section is programmed to allow for scrolling between the alternative homes.

10. The method of claim 9, further comprising searching for the loans based solely on the down payment amount or the monthly payment amount.

11. The method of claim 9, further comprising:

identifying the one or more homes meeting the home parameters; and identifying one or more loans meeting the loan parameters.

12. The method of claim 9, wherein the information about the one or more homes includes the down payment amount or the monthly payment amount for each of the one or more homes.

13. The method of claim 9, further comprising facilitating a purchase of one of the one or more homes.

14. The method of claim 13, further comprising:

enabling the buyer to make an offer for a specific home from the one or more homes;

upon receipt of the offer by the buyer, initiating an offer message to a seller of the specific home which enables the seller to accept the offer; and upon acceptance of the offer by the seller, initiating an acceptance message notifying the buyer, the seller, and other parties associated with a sale of the specific home.

* * * * *